(12) United States Patent
Gonze et al.

(10) Patent No.: US 8,707,684 B2
(45) Date of Patent: Apr. 29, 2014

(54) CONTROL METHOD AND APPARATUS FOR REGENERATING A PARTICULATE FILTER

(75) Inventors: Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 646 days.

(21) Appl. No.: 12/944,287

(22) Filed: Nov. 11, 2010

(65) Prior Publication Data
US 2012/0117946 A1    May 17, 2012

(51) Int. Cl.
*F01N 3/00*    (2006.01)
(52) U.S. Cl.
USPC ............................... 60/295; 60/274; 60/297
(58) Field of Classification Search
USPC .......................................................... 60/295
See application file for complete search history.

(56) References Cited

U.S. PATENT DOCUMENTS

| | | | | |
|---|---|---|---|---|
| 4,516,993 | A * | 5/1985 | Takeuchi et al. ................ | 55/283 |
| 5,144,798 | A | 9/1992 | Kojima et al. | |
| 5,822,977 | A * | 10/1998 | Fukuda et al. .................. | 60/274 |
| 2002/0194996 | A1 * | 12/2002 | Peter et al. ...................... | 95/278 |
| 2004/0226287 | A1 * | 11/2004 | Edgar et al. ..................... | 60/295 |
| 2006/0021332 | A1 * | 2/2006 | Gaiser ............................. | 60/286 |
| 2006/0153761 | A1 * | 7/2006 | Bandl-Konrad et al. .. | 423/239.1 |
| 2008/0282673 | A1 * | 11/2008 | Gonze et al. .................... | 60/284 |
| 2009/0019837 | A1 * | 1/2009 | Suzuki et al. ................... | 60/286 |
| 2009/0071124 | A1 * | 3/2009 | Gonze et al. .................... | 60/285 |
| 2009/0113874 | A1 * | 5/2009 | McKee ............................ | 60/272 |
| 2009/0173063 | A1 * | 7/2009 | Boorse et al. ................... | 60/299 |
| 2009/0306850 | A1 * | 12/2009 | Lee et al. ........................ | 701/33 |
| 2010/0005787 | A1 * | 1/2010 | Hosoya et al. .................. | 60/286 |

FOREIGN PATENT DOCUMENTS

| | | | |
|---|---|---|---|
| DE | 69116644 T2 | 6/1996 | |
| EP | 1788207 A1 | 5/2007 | |
| JP | 06002532 A * | 1/1994 | ............... F01N 3/02 |

OTHER PUBLICATIONS

English Translation of JP06-002532A.*

\* cited by examiner

*Primary Examiner* — Thomas Denion
*Assistant Examiner* — Jason Shanske
(74) *Attorney, Agent, or Firm* — Cantor Colburn LLP

(57) ABSTRACT

Control methods for regenerating particulate filter and an apparatus that includes an internal combustion engine, an exhaust gas conduit in fluid communication with and configured to receive exhaust gas from the internal combustion engine, and a particulate filter assembly in fluid communication with the exhaust gas conduit and configured to receive exhaust gas flowing therethrough. The particulate filter assembly includes a particulate filter to remove particulates from the exhaust gas, a heater device disposed near a front face of the particulate filter, to supply heat for regeneration of the particulate filter after shut-off of the internal combustion engine, and an air pump to input air into the particulate filter to transfer the supplied heat from the heater device to the particulate filter.

14 Claims, 3 Drawing Sheets

CONTROL METHOD AND APPARATUS FOR REGENERATING A PARTICULATE FILTER

FIELD OF THE INVENTION

Exemplary embodiments of the present invention relate to exhaust gas treatment systems for internal combustion engines and, more particularly, to particulate filter (PF) regeneration.

BACKGROUND

The exhaust gas emitted from an internal combustion engine, is a heterogeneous mixture that may contain gaseous emissions such as carbon monoxide ("CO"), unburned hydrocarbons ("HC") and oxides of nitrogen ("NOx") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

In an exhaust treatment technology, there are several known filter structures used that have displayed effectiveness in removing the particulate matter from the exhaust gas such as ceramic honeycomb wall flow filters, wound or packed fiber filters, open cell foams, sintered metal fibers, etc. Ceramic wall flow filters have experienced significant acceptance in automotive applications.

Typically, a particulate filter is disposed along the exhaust stream to filter the particulates from the exhaust. Over time, the particulate filter may become full and regeneration is required to remove any trapped particulates. Regeneration of a particulate filter in vehicle applications is typically automatic and is controlled by an engine or other controller based on signals generated by engine and exhaust system sensors. The regeneration event involves increasing the temperature of the particulate filter to levels that are often above 600° C. in order to burn the accumulated particulates to enable the continuation of the filtering process.

There are drawbacks associated with the regeneration process. These include the fuel consumption required to regenerate the particulate filter and exhaust emissions that are created by the regeneration process (e.g., upward adjustment factors (UAF) for NOx and HC).

Accordingly, it is desirable to provide an apparatus and method for regenerating a particulate filter that will result in reduced fuel consumption and near zero exhaust emission during particulate filter regeneration.

SUMMARY OF THE INVENTION

In order to obviate the above-mentioned problems, the present invention provides a method of regenerating a diesel particulate filter (DPF) immediately after engine shut off.

In an exemplary embodiment of the present invention, an exhaust gas particulate filter system for internal combustion engine is provided. The exhaust gas particulate filter system for internal combustion engine includes an internal combustion engine, an exhaust gas conduit in fluid communication with and configured to receive exhaust gas from the internal combustion engine, and a particulate filter assembly in fluid communication with the exhaust gas conduit and configured to receive exhaust gas flowing therethrough. The particulate filter assembly includes a particulate filter to remove particulates from the exhaust gas, a heater device disposed near a front face of the particulate filter, to supply heat for regeneration of the particulate filter after shut-off of the internal combustion engine, and an air pump to input air into the particulate filter to transfer the supplied heat from the heater device to the particulate filter.

In an exemplary embodiment of the present invention, a control method for regenerating an exhaust gas particulate filter assembly of an internal combustion engine including a particulate filter and a heater device disposed upstream thereof is provided. The control method includes determining whether the internal combustion engine has been turned off, determining whether to initiate a regeneration operation of the particulate filter when it has been determined that the internal combustion engine has been turned off, activating the heater device when it has been determined that the internal combustion engine has been turned off and activating an air pump to transfer heat from the heater device to perform a regeneration operation of the particulate filter.

In another exemplary embodiment of the present invention, a control method for regenerating an exhaust gas particulate filter assembly of an internal combustion engine including a particulate filter and a heater device disposed upstream thereof is provided. The control method includes determining whether the internal combustion engine has been turned off, determining whether to initiate a regeneration operation of the particulate filter in a zoned manner via a plurality of zones of the heater device, when it has been determined that the internal combustion engine has been turned off, activating a first zone of the plurality of zones of the heater device to supply heat to a zone of the particulate filter, activating an air pump to transfer the heat from the first zone of the plurality of zones of the heater device through the particulate filter to perform a regeneration operation of the zone of the particulate filter, and subsequently activating a next zone of the plurality of zones of the heater device to transfer heat to a next zone to the particulate filter until a plurality of zones of the particulate filter have been heated and regeneration of the particulate filter has been completed.

The above features and advantages, and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
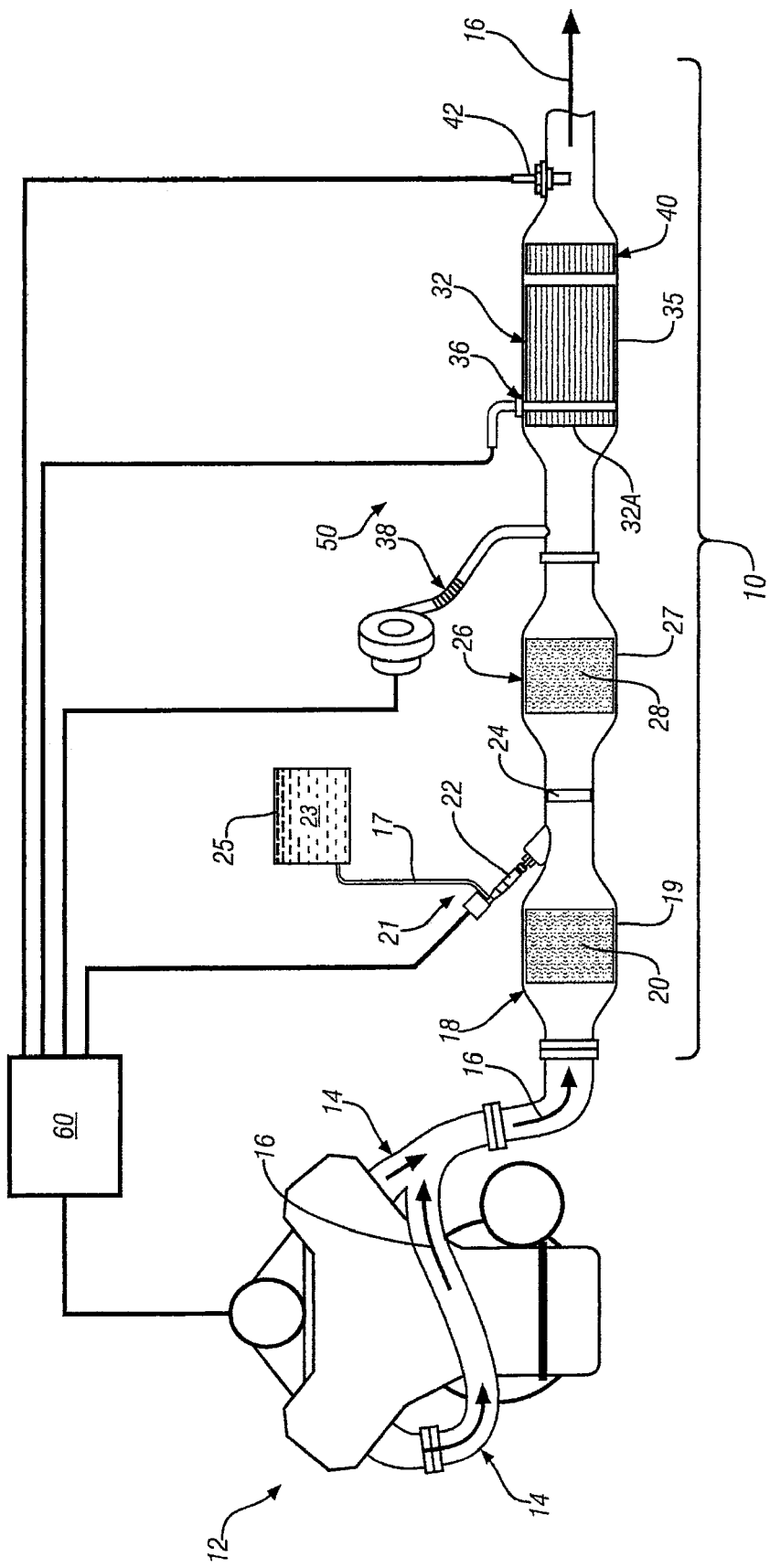
FIG. 1 is a schematic view of an exhaust gas treatment system for an internal combustion engine.

The following description is merely exemplary in nature and is not intended to limit the present disclosure, application or uses. It should be understood that throughout the drawings, corresponding reference numerals indicate like or corresponding parts and features.

Referring now to FIG. 1, an exemplary embodiment of the invention is directed to an exhaust gas treatment system, referred to generally as 10, for the reduction of regulated exhaust gas constituents of an internal combustion engine 12. According to an embodiment of the present invention, the exhaust gas treatment system 10 includes a particulate filter assembly 50 having a particulate filter 32 (to be described later) and an air pump 38 to supply oxygen required to perform a regeneration operation of the particulate filter 32. A catalyst on the particulate filter 32 minimizes emission of gases such as carbon monoxide (CO) during the regeneration operation. The present invention further discloses a method of performing regeneration of the particulate filter 32 immediately after engine shut-off. Normally the particulate filter 32 is regenerated when the exhaust temperature is raised to oxidize particulate matter entrained therein. The temperature at the particulate filter 32 is controlled to a level that will not cause the PM to thermally runaway (typically in a range of between 350 to 600 C.). This regeneration temperature is normally maintained for approximately 15 to 30 minutes.

According to an embodiment of the present invention, an internal combustion engine 12 is provided. It can be appreciated that the invention described herein can be implemented in various engine systems implementing an exhaust particulate filter. Such engine systems may include, but are not limited to, diesel engines, gasoline direct injection systems and homogeneous charge compression ignition engine systems.

The exhaust gas treatment system 10 includes an exhaust gas conduit 14, which may comprise several segments and is in fluid communication with and configured to receive exhaust gas from the internal combustion engine 12 and to transport exhaust gas 16 from the engine 12 to the various exhaust treatment devices of the exhaust gas treatment system 10.

According to an embodiment of the present invention, the exhaust treatment devices may include a catalyst device 18 upstream of the particulate filter 32 to induce oxidation of the exhaust gas constituents and to heat the exhaust gas 16. According to an embodiment of the present invention, the catalyst device 18 may be an oxidation catalyst ("OC") device. The oxidation catalyst device 18 may include a flow-through metal or ceramic monolith substrate 20 that is wrapped in an intumescent mat (not shown) that expands when heated, securing and insulating the substrate which is packaged in a rigid shell or canister 19 having an inlet and an outlet in fluid communication with exhaust gas conduit 14. The substrate may include an oxidation catalyst compound (not shown) disposed thereon which may be applied as a wash coat and may contain platinum group metals such as platinum (Pt), palladium (Pd), rhodium (Rh) or other suitable oxidizing catalysts, or combination thereof. The oxidation catalyst device 18 is useful in treating unburned gaseous and non-volatile HC and CO, which are oxidized to form carbon dioxide and water.

According to an embodiment of the present invention, a supply device 21 is connected to and is in fluid communication with the exhaust gas conduit 14. According to the current embodiment of the present invention, the supply device 21 includes an injector 22 disposed between the oxidation catalyst device 18 and a mixer or turbulator 24 disposed downstream from the oxidation catalyst device 18. The injector 22 and the mixer 24 are connected to and are in fluid communication with the exhaust gas conduit 14. The injector 22 is configured to periodically and selectively inject a reductant 23 such as urea or ammonia, or a combination thereof, into the exhaust gas flow between the oxidation catalyst device 18 and the mixer 24. Other suitable methods of delivery of the reductant 23 to the exhaust gas 16 may be used. The reductant 23 is supplied from a reductant supply tank 25 through conduit 17. The reductant 23 may be in the form of a gas, a liquid or an aqueous urea solution and may be mixed with air in the injector 22 to aid in the dispersion of the injected spray in the exhaust gas 16. The mixer or turbulator 24 is disposed within the exhaust conduit 14 in close proximity to the injector 22 to further assist in thorough mixing of the reductant 23 with the exhaust gas 16.

A selective catalytic reduction device ("SCR") 26 may be disposed downstream of the oxidation catalyst device 18. In a manner similar to the oxidation catalyst device 18, the SCR 26 may also include a flow-through ceramic or metal monolith substrate 28 that is wrapped in an intumescent mat (not shown) that expands when heated, securing and insulating the substrate which is packaged in a rigid shell or canister 27 having an inlet and an outlet in fluid communication with exhaust gas conduit 14. The substrate has an SCR catalyst composition (not shown) applied thereto. The SCR 26 catalyst composition preferably contains a zeolite and one or more base metal components such as iron ("Fe"), cobalt ("Co"), copper ("Cu") or vanadium ("V") which can operate efficiently to convert NOx constituents in the exhaust gas 16 in the presence of the reductant 23. More details concerning the exhaust gas treatment system 10 will now be discussed. As further shown in FIG. 1, according to an embodiment of the present invention, the particulate filter assembly 50 is in fluid communication with the exhaust gas conduit 14 and is configured to receive the exhaust gas 16. The particulate filter assembly 50 includes the particulate filter 32 disposed in a canister or shell 35 to remove particulates from the exhaust gas 16. The particulate filter assembly 50 further includes a heater device 36 such as a heater grid to supply heat to the particulate filter 32. Details regarding the particulate filter 32 and the heater device 36 will be described below with reference to FIGS. 2 and 3.

According to an embodiment of the present invention, as further shown in FIG. 1, the particulate filter assembly 50 further includes an air pump 38 to input air into the exhaust gas treatment system 10 to transfer the supplied heat from the heater device 36 to the particulate filter 32 upon activation of the air pump 38. An optional slip catalyst 40 may be used if the particulate filter 32 does not include an oxidizing catalyst, or when a combination DPF/SCR filter is used.

According to an embodiment of the present invention, a temperature sensor 42 is also provided and is in fluid communication with the exhaust gas in the particulate filter assembly 50 and is configured to generate a signal indicative of a temperature of the exhaust gas 16 therein. A description of the electrically-heated particulate filter 32 and heater device 36 will now be discussed.

Figure 2:
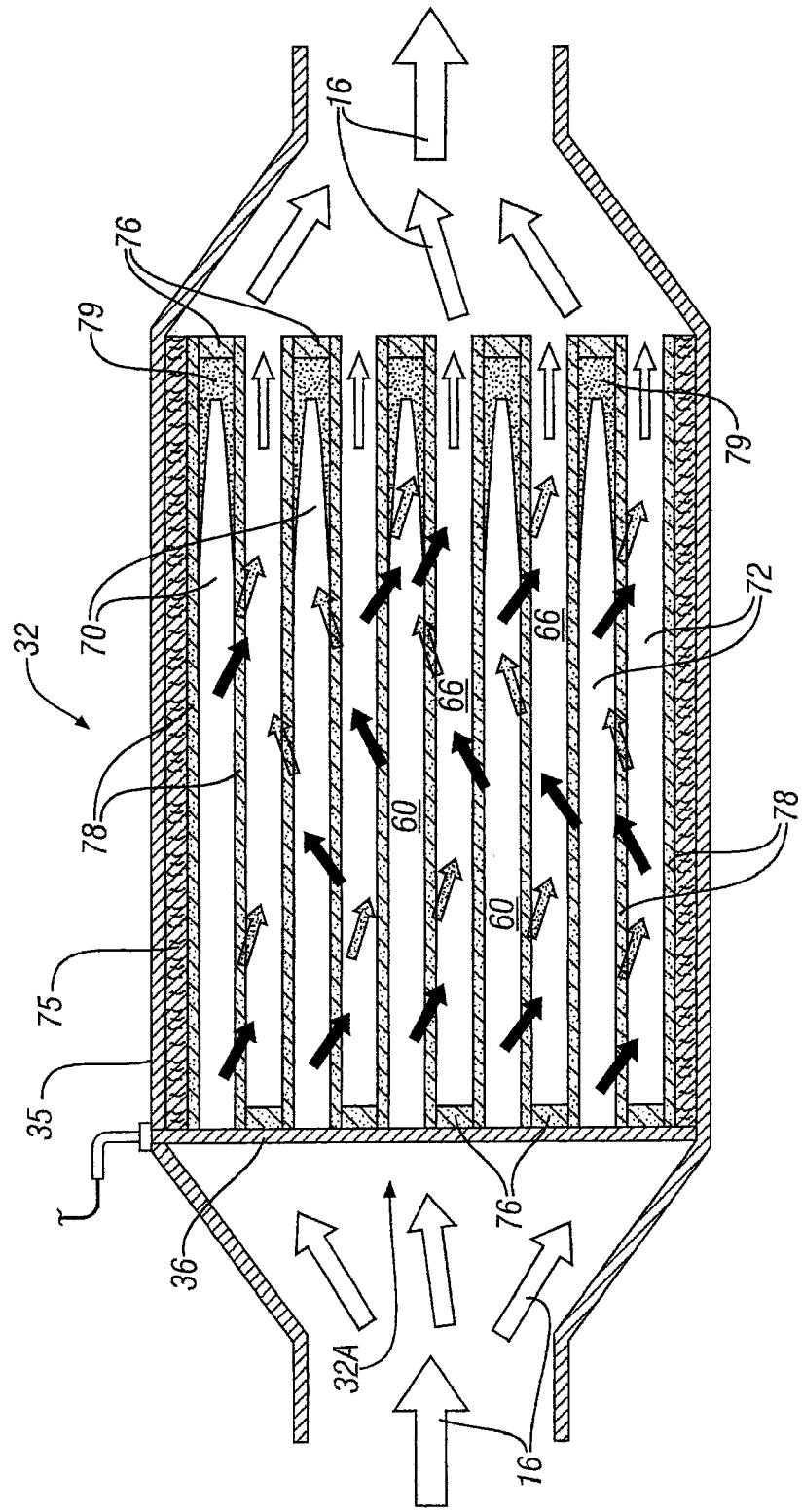
FIG. 2 is a sectional view of an exemplary embodiment of a particulate filter embodying aspects of the present invention.
Figure 3:
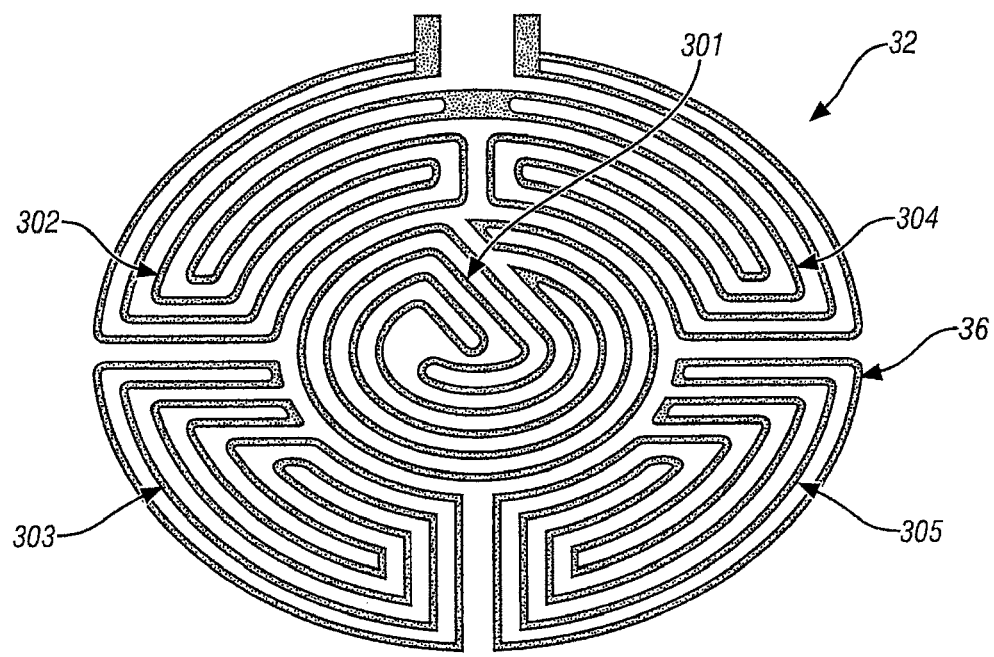
FIG. 3 is an exemplary embodiment of a heater device disposed near a front face of the particulate filter shown in FIG. 2 embodying aspects of the present invention.

FIGS. 2 and 3 are diagrams illustrating the particulate filter 32 and the heater device 36, respectively, and as shown in FIG. 1, that can be implemented within embodiments of the present invention. As shown in FIG. 1, the particulate filter 32 is located within the exhaust gas treatment system 10, downstream of the SCR 26 and operates to filter the exhaust gas 16 of carbon and other particulates.

As shown in FIG. 2, the particulate filter 32 is a monolith particulate trap, and includes alternating closed cells/channels 70 and opened cells/channels 72. A particulate filter mat material 75 surrounds the monolith particulate trap and the outer shell 35 surrounds the particulate filter mat 75. The cells/channels 70, 72 are typically squared cross-sections, extending axially through the particulate filter 32. Walls 78 of the filter 32 may comprise a porous ceramic honeycomb wall of cordierite material. Any type of ceramic material suitable for the purpose set forth herein may be utilized. Adjacent channels are alternatively plugged 76 at each end. The engine exhaust 16 is then forced to flow through the substrate walls 78 which acts as a mechanical filter. Particulate matter is deposited within the closed channels 70 and exhaust gas 16 exits through the open channels 72. Soot particles 79 flow into the filter 32 and are trapped therein. As mentioned above, according to an embodiment of the present invention, the particulate filter 32 is an electrically-heated particulate filter. The heater device 36 is disposed on or near a front face 32a of the particulate filter 32 as shown in FIGS. 1 and 2. A method for regenerating the particulate filter 32 using the heater device 36 will be discussed below and with reference to FIG. 4.

According to another embodiment of the present invention, the particulate filter 32 may be a zoned electrically-heated particulate filter. Additional details regarding the plurality of zones of the heater device 36 and regenerating the particulate filter 32 in a zoned manner will now be discussed with reference to FIG. 3. As shown in FIG. 3, the heater device 36 may be divided into a plurality of zones 301 through 305. The heater device 36 is configured to supply heat subsequently to each zone 301 through 305 such that the particulate filter 32 is heated and regenerated in a zoned manner. Each zone 301 through 305 is individually heated such that the particulate filter 32 is selectively heated in stages. According to an embodiment of the present invention, each zone 301 through 305 can be heated separately by supplying power to a resistive pathway located within each zone 301 through 305. For example, zone 301 may be heated first, thereby heating a center region of the particulate filter 32. Secondly, zone 302 may be heated to thereby heat an outer radial region of the particulate filter 32 and so on. It is appreciated that the particulate filter 32 is heated in segments via the use of the heater device 36. It is contemplated that the particulate filter 32 may be segmented into a plurality of zones using a plurality of heater formats, therefore the present invention is not limited to the embodiment of FIG. 3. A method for regenerating the particulate in a zoned manner will be described below and with reference to FIG. 5.

In an exemplary embodiment, the increase in exhaust backpressure caused by the accumulation of particulate matter 79 (PM) requires that the particulate filter 32 is periodically cleaned, or regenerated. Regeneration involves the oxidation or burning of the accumulated carbon and other particulates 79, FIG. 2, in what is typically a high temperature (>600° C.) environment. According to an embodiment of the present invention, the regeneration operation of regions of the particulate filter 32 are performed separately for each zone 301 through 305 such that one zone 301 through 305 is subsequently heated after another based upon need and not in any particular order. A description of regeneration operations of the exhaust gas particulate filter assembly 50 will be described below and with reference to FIGS. 4 and 5.

Figure 4:
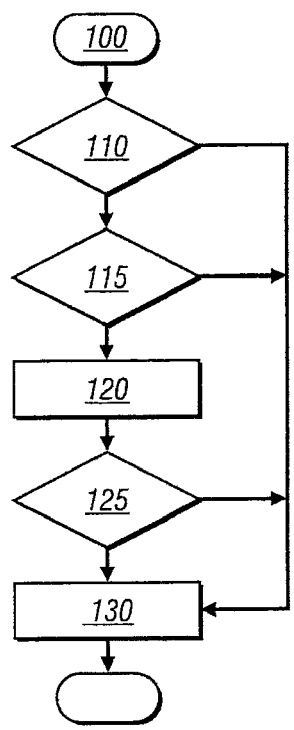
FIG. 4 is a flowchart of a control method for regenerating an exhaust gas particulate filter embodying aspects of the present invention.

FIG. 4 is a flowchart illustrating a method for regenerating the exhaust gas particulate filter 32 following the shut-down of internal combustion engine 12. The control method begins at operation 100. At operation 110, it is determined whether the internal combustion engine 12 (as depicted in FIG. 1) has been turned off. If it is determined that the engine 12 is not turned off then the regeneration operation of the particulate filter 32 may be delayed. When it has been determined in operation 110 that the internal combustion engine 12 has been turned off, it is immediately determined whether to initiate a regeneration operation of the particulate filter, for example by performing operations 115 through 125.

At operation 115, it is determined whether a temperature of the particulate filter 32 is greater than a first particulate material (PM) e.g. carbon monoxide (CO) light-off temperature. According to one embodiment of the present invention, the first PM light-off temperature may be approximately 200° C. When it is determined that the temperature of the particulate filter 32 is greater than the first PM light-off temperature at operation 115, the process continues to operation 120 where the heater device 36 upstream of the particulate filter 32 is turned on. From operation 120, the process continues to operation 125 where it is determined whether a heater temperature of the heater device 36 is greater than a second PM light-off temperature. According to one embodiment of the present invention, the second PM light-off temperature may be approximately 800° C. If it is determined that the heater temperature is less than the second PM light-off temperature, a regeneration operation of the particulate filter is not performed. On the other hand, when it is determined that the heater temperature is greater than the second PM light-off temperature in operation 125, the process moves to operation 130 where the air pump 38 disposed upstream from the particulate filter 32 is activated to transfer heat via the heater device 36 to the particulate filter 32 to perform regeneration of the particulate filter 32. According to an embodiment of the present invention, the heater temperature may be determined based on the impedance of the heater device 36 or sensor(s) may be provided to detect the heater temperature as well as the first and second PM light-off temperatures.

Figure 5:
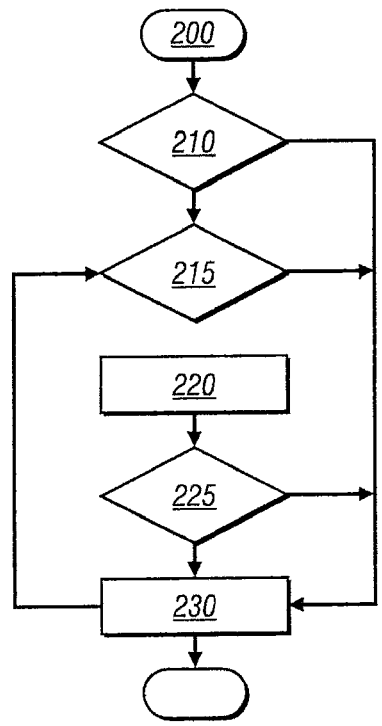
FIG. 5 is a flowchart of a control method for regenerating an exhaust gas particulate filter embodying other aspects of the present invention.

According to another embodiment of the present invention, the particulate filter 32 may be regenerated in a zoned manner following the shut-down of the combustion engine 12 as discussed below and with reference to FIG. 5. The control method begins at operation 200. At operation 210, it is determined whether the internal combustion engine 12 has been turned off. If it is determined that the engine 12 is not turned off then the regeneration operation of the particulate filter 32 may be delayed. When it is determined in operation 210 that the engine 12 has been turned off, it is immediately determined whether to initiate a regeneration operation of the particulate filter 32 by performing operations 215 through 230.

At operation 215, it is determined whether a temperature of the particulate filter 32 is greater than a first particulate material (PM) light-off temperature. When it is determined that the temperature of the particulate filter 32 is greater than the first PM light-off temperature at operation 215, the process continues to operation 220 where a selected zone (e.g., a first zone 301) of the heater device 36 is heated. From operation 220, the process continues to operation 225 where it is determined whether the heater temperature of the heater device 36 is greater than a second PM light-off temperature. If it is determined that the heater temperature is less than the second PM light-off temperature, a regeneration operation of the particulate filter is not performed. On the other hand, when it is determined that the heater temperature is greater than the second PM light-off temperature in operation 225, the process moves to operation 230 where the air pump 38 is activated to transfer the heat from the selected zone (e.g., 301) of the heater device 36 to the particulate filter 32 to perform regeneration of the selected zone of the particulate filter 32.

According to an embodiment of the present invention, operations 215 through 230 are repeated as necessary until a total of the plurality of zones 301 through 305 requiring regeneration have been heated and regeneration of the particulate filter 32 has been completed.

Referring again to FIG. 1, a controller 60 such as a vehicle or engine controller is operably connected to, and monitors, the engine 12 and the exhaust gas treatment system 10 through signal communication with a number of sensors. According to another embodiment of the present invention, a separate control module may be provided to control and monitor the exhaust gas treatment system 10. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality. The controller 60 may be configured to control the supply of reductant 23 to be injected via the injector 22, and further control the particulate filter assembly 50 to activate the air pump 38, to control the performance of a regeneration operation of the particulate filter 32 when determined, and to deactivate the air pump 38 after completion of the regeneration of the particulate filter 32.

Embodiments of the present invention provide an air pump, a catalyzed particulate filter, and an electric heater to perform regeneration of the particulate filter after engine shutdown. Therefore, the present invention provides the advantages of reducing fuel consumption and achieving near zero emissions during the regeneration operation of the particulate filter.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas particulate filter system for an internal combustion engine, comprising:
   an internal combustion engine;
   an exhaust gas conduit in fluid communication with and configured to receive exhaust gas from the internal combustion engine;
   an oxidation catalyst in fluid communication with and configured to receive exhaust gas from the internal combustion engine to induce oxidation of the exhaust gas and heat the exhaust gas;
   a reductant injector downstream of the oxidation catalyst and connected to and in fluid communication with the exhaust gas conduit;
   a particulate filter assembly downstream of the reductant injector and in fluid communication with the exhaust gas conduit and configured to receive exhaust gas flowing therethrough, the particulate filter assembly comprising:
      a particulate filter to remove particulates from the exhaust gas;
      a heater device disposed near a front face of the particulate filter, to supply heat for regeneration of the particulate filter, after shut-off of the internal combustion engine, wherein the heater device comprises a plurality of zones to supply heat subsequently to each of the zones for regeneration of the particulate filter in a zoned manner; and
      an air pump to input air into the particulate filter to transfer the supplied heat from the heater device to the particulate filter;
   a temperature sensor downstream of the particulate filter and configured to generate a signal indicative of a temperature of the exhaust gas in the particulate filter; and
   a controller configured to:
   control the particulate filter assembly to activate the air pump, to regenerate the particulate filter and to deactivate the air pump after completion of regeneration of the particulate filter.

2. The exhaust gas particulate filter system of claim 1, wherein a slip catalyst is disposed downstream from the particulate filter.

3. The exhaust gas particulate filter system of claim 1, wherein the particulate filter comprises a catalyzed particulate filter.

4. The exhaust gas particulate filter system of claim 1, wherein the plurality of zones comprises five zones.

5. The exhaust gas particulate filter system of claim 1, wherein the heating device is substantially circular and further comprises a plurality of resistive pathways in a substantially circular orientation.

6. The exhaust gas particulate filter system of claim 5, further comprising a first resistive pathway corresponding to a first zone of the plurality of zones, the first resistive pathway located in a center of the heating device and having a substantially circular orientation.

7. The exhaust gas particulate filter system of claim 6, further comprising a second resistive pathway corresponding to a second zone of the plurality of zones, the second resistive pathway located in a quadrant of the heating device radially outward of the substantially circular first resistive pathway.

8. The exhaust gas particulate filter system of claim 7, further comprising a third, a fourth, and a fifth resistive pathway corresponding to a third zone, a fourth zone, and a fifth zone of the plurality of zones, respectively, each of the second, third, fourth, and fifth resistive pathways located in a separate quadrant of the heating device radially outward of the substantially circular first resistive pathway.

9. A control method for regenerating an exhaust gas particulate filter assembly of an internal combustion engine comprising a particulate filter and a heater device disposed upstream thereof, the control method comprising:
   determining whether the internal combustion engine has been turned off;
   determining whether to initiate a regeneration operation of the particulate filter when it has been determined that the internal combustion engine has been turned off, wherein determining whether to initiate a regeneration operation of the particulate filter comprises:
      determining whether a temperature of the particulate filter is greater than a carbon monoxide light-off temperature.
   activating the heater device when it has been determined that the internal combustion engine has been turned off; and
      determining whether a temperature of the heater is greater than a second particulate matter light-off temperature after activating the heater device; and
   when it is determined that the heater temperature is greater than the second particulate matter light-off temperature, activating an air pump to transfer heat from the heater device to perform a regeneration operation of the particulate filter, when the engine is off, to reduce fuel consumption and produce near zero emissions.

10. The control method of claim 9, wherein when the temperature of the particulate filter is less than the first particulate matter light-off temperature, a regeneration operation of the particulate filter is not performed.

11. The control method of claim 9, wherein when the heater temperature of the heater device is less than the second particulate matter light off temperature, the regeneration operation of the particulate filter is not performed.

12. A control method for regenerating an exhaust gas particulate filter assembly of an internal combustion engine comprising a particulate filter and a heater device disposed upstream thereof, the control method comprising:
   determining whether the internal combustion engine has been turned off;
   determining whether to initiate a regeneration operation of the particulate filter in a zoned manner via a plurality of zones of the heater device, when it has been determined that the internal combustion engine has been turned off, wherein determining whether to initiate a regeneration operation of the particulate filter comprises:
      determining whether a temperature of the particulate filter is greater than a first particulate matter light-off temperature, wherein the first particulate matter light-off temperature is a carbon monoxide light-off temperature;
      when it is determined that the temperature of the particulate filter is greater than the first particulate matter light-off temperature, activating a first zone of the plurality of zones of the heater device to supply heat to a zone of the particulate filter; and
      determining whether a heater temperature is greater than a second particulate matter light-off temperature after activating the heater device;
   when it is determined that the heater temperature is greater than the second particulate matter light-off temperature, activating an air pump to transfer the heat from the first zone of the plurality of zones of the heater device through the particulate filter to perform a regeneration operation of the zone of the particulate filter; and
   subsequently activating a next zone of the plurality of zones of the heater device to transfer heat to a next zone to the particulate filter until a plurality of zones of the particulate filter have been heated and regeneration of the particulate filter has been completed while the engine is off to reduce fuel consumption and produce near zero emissions.

13. The control method of claim 12, wherein when the temperature of the particulate filter is less than the first particulate matter light-off temperature, a regeneration operation of the particulate filter is not performed.

14. The control method of claim 13, wherein when the heater temperature of the heater device is less than the second particulate matter light off temperature, the regeneration operation of the particulate filter is not performed.

* * * * *